US008355868B2

(12) United States Patent
Brace

(10) Patent No.: US 8,355,868 B2
(45) Date of Patent: Jan. 15, 2013

(54) METHOD AND SYSTEM FOR SPECTRAL IMAGE CELESTIAL NAVIGATION

(75) Inventor: Terrell Michael Brace, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 700 days.

(21) Appl. No.: 12/570,916

(22) Filed: Sep. 30, 2009

(65) Prior Publication Data
US 2011/0077863 A1 Mar. 31, 2011

(51) Int. Cl.
*G01C 21/02* (2006.01)
(52) U.S. Cl. ........ 701/513; 701/409; 701/500; 701/531; 701/494; 342/64; 342/357.57; 382/218; 382/275
(58) Field of Classification Search .................. 701/222, 701/200, 220, 226, 217, 221, 207, 213, 208, 701/4, 13; 359/399; 244/171; 342/64, 357.57
See application file for complete search history.

(56) References Cited

U.S. PATENT DOCUMENTS

| | | | |
|---|---|---|---|
| 4,621,329 A | 11/1986 | Jacob | |
| 7,349,803 B2 | 3/2008 | Belenkii et al. | |
| 7,349,804 B2 | 3/2008 | Belenkii et al. | |
| 7,447,591 B2 | 11/2008 | Belenkii et al. | |
| 7,496,241 B1 * | 2/2009 | Reneker et al. | 382/275 |
| 7,526,381 B2 | 4/2009 | Twitchell, Jr. | |
| 2006/0085130 A1 | 4/2006 | Belenkii et al. | |
| 2007/0038374 A1 * | 2/2007 | Belenkii et al. | 701/222 |
| 2007/0117078 A1 | 5/2007 | Bruns et al. | |
| 2009/0182504 A1 | 7/2009 | Twitchell | |

OTHER PUBLICATIONS

Search Report & Written Opinion issued from corresponding application No. PCT/US2010/044632, Dec. 3, 2010.
Colavita et al, "Two-color method for optical astrometry: theory and preliminary measurements with the Mark III stellar interferometer" Applied Optics USA, vol. 26, No. 19, Oct. 1, 1987, pp. 4113-4122, XP002607540.

* cited by examiner

*Primary Examiner* — Thomas Black
*Assistant Examiner* — Luke Huynh
(74) *Attorney, Agent, or Firm* — David J. Clement, Esq.; Armstrong Teasdale LLP

(57) ABSTRACT

A method and system for a multi-spectrum celestial navigation system includes a first sensor responsive to at least a first and a second wavelength band of electromagnetic radiation. The sensor is configured to generate a first output related to the first wavelength band of electromagnetic radiation and to generate a second output related to the second wavelength band of electromagnetic radiation. The system also includes a processor programmed to receive the first and second outputs, determine a position of the sensor with respect to one or more stars using a stored star catalog and the received first and second outputs, and output the determined position.

18 Claims, 8 Drawing Sheets

METHOD AND SYSTEM FOR SPECTRAL IMAGE CELESTIAL NAVIGATION

BACKGROUND OF THE INVENTION

The field of the invention relates generally to celestial navigation system, and more specifically, to a method and system for a multi-spectral celestial navigation system.

Celestial navigation systems provide a non-jamable, non emitting, self-contained navigation solution that is well adapted for use on the surface of the earth as well as airborne and space borne vehicles. At least some known celestial navigation systems use a lens systems coupled to a visual range CCD imager and are subject to a very limiting factor in that they are subject to obscuration by weather phenomenon such as but not limited to clouds, fog, and smoke. Because existing celestial navigation systems are at times intermittent at providing positioning information, such systems are used in tandem with other types of navigation systems such as inertial or dead reckoning systems, GPS positional technology, and ground-based navigation systems (radio aids) to provide navigational information when the celestial navigation can not. Existing inertial solutions are prone to drift over time, GPS solutions are subject to electronic interference, faked signals, and attack on the ground and space-based infrastructure. Ground based navigation (radio aids) are expensive to maintain, prone to large errors compared to existing INS and GPS technology, and are currently being phased out.

BRIEF DESCRIPTION OF THE INVENTION

In one embodiment, a multi-spectrum celestial navigation system is provided. The system includes a first sensor responsive to at least a first and a second wavelength band of electromagnetic radiation. The sensor is configured to generate a first output related to the first wavelength band of electromagnetic radiation and to generate a second output related to the second wavelength band of electromagnetic radiation. The system also includes a processor programmed to receive the first and second outputs, determine a position of the sensor with respect to one or more stars using a stored star catalog and the received first and second outputs, and output the determined position.

In another embodiment, a method of determining a location of a vehicle using multi-spectrum celestial imager is provided. The method includes acquiring an image of the sky using a sensor of the imager that is responsive to at least a first and a second wavelength band of electromagnetic radiation, determining a plurality of stellar objects in the image using the acquired image, and comparing the stellar objects to a stored star catalog. The method also includes determining at least one of a position of the imager relative to the determined stellar objects and an attitude of the imager relative to the stellar objects, and outputting the at least one of the determined position and the determined attitude.

In yet another embodiment, a vehicle is provided. The vehicle includes a plurality of sensors, each responsive to at least a first and a second wavelength band of electromagnetic radiation emitted by a plurality of stellar objects in a field of view of the sensor wherein each sensor is communicatively coupled to a sensor processor onboard the sensor. The sensor processor is programmed to generate an image of the plurality of stellar objects. The vehicle also includes a main processor communicatively coupled to the sensor processor wherein the main processor programmed is to receive the images generated by the sensor processors, determine a position of the respective sensor with respect to one or more stars using a stored star catalog and the received images, and output the determined position.

BRIEF DESCRIPTION OF THE DRAWINGS

FIG. 1 is schematic block diagram of a multi-spectrum celestial navigation system in accordance with an exemplary embodiment of the present invention;

FIG. 2 is a schematic block diagram of the multi-spectral sensor shown in FIG. 1 in accordance with an exemplary embodiment of the present invention;

FIG. 3 is a schematic block diagram of the multi-spectral sensor shown in FIG. 1 in accordance with another embodiment of the present invention;

FIG. 4 is another schematic block diagram of the multi-spectrum celestial navigation system shown in FIG. 1 in accordance with another embodiment of the present invention;

FIG. 5 is a control/data flow chart of the multi-spectral sensor shown in FIG. 1 in accordance with an exemplary embodiment of the present invention;

FIG. 6 is a control/data flow chart of the multi-spectrum celestial navigation system in accordance with an exemplary embodiment of the present invention;

FIG. 7 is a flow chart of a method of determining a position and/or orientation of a vehicle using the multi-spectrum celestial navigation system shown in FIG. 1 in accordance with an exemplary embodiment of the present invention;

FIG. 8 is a flow chart of a method for modeling an atmospheric distortion in accordance with an exemplary embodiment of the present invention; and FIG. 9 is a flow chart of a method for correcting distortion in sensor images in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of determining a vehicle navigational position using only celestial means in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
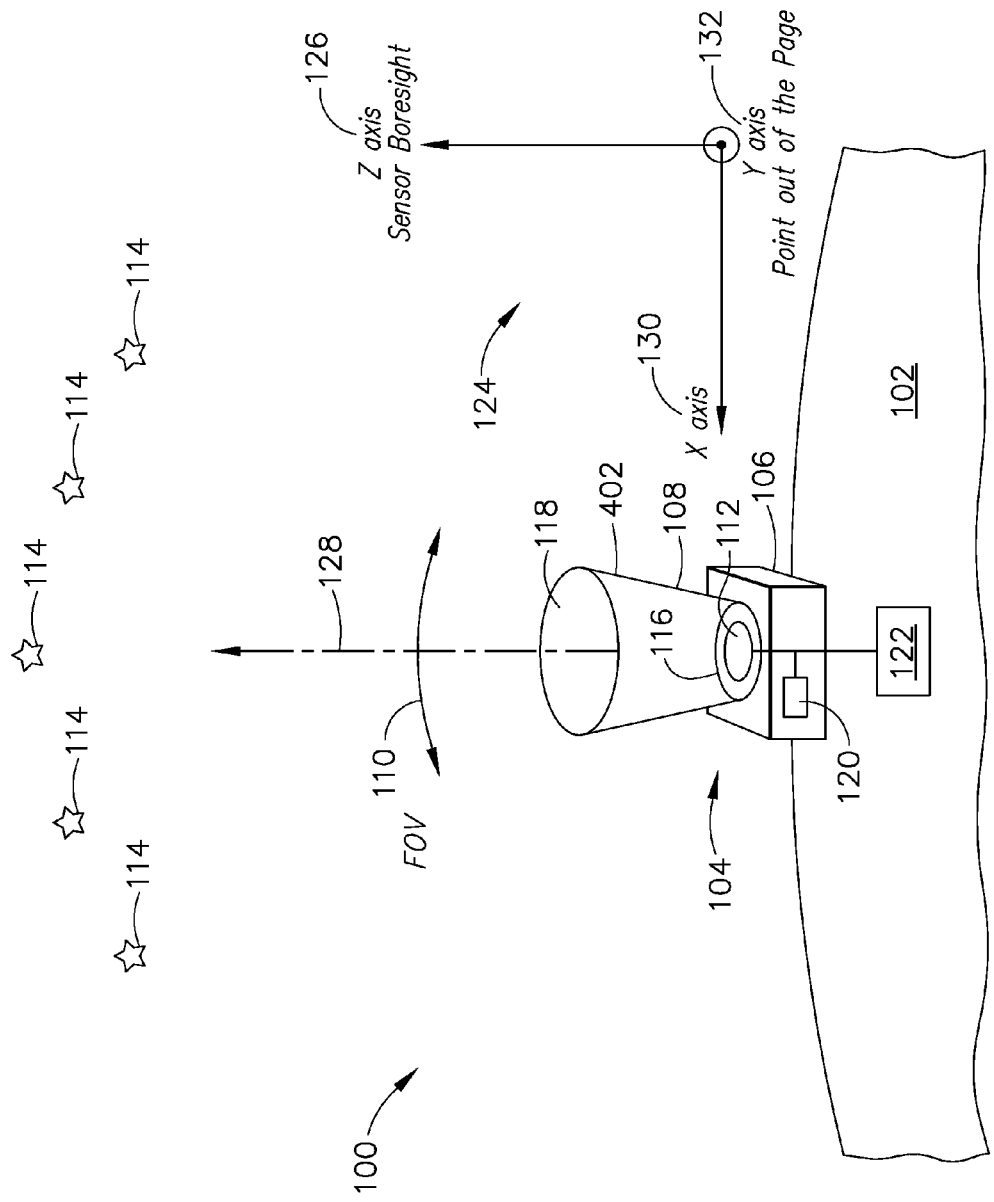
FIGS. 1-9 show exemplary embodiments of the method and system described herein.

FIG. 1 is schematic block diagram of a multi-spectrum celestial navigation system 100 in accordance with an exemplary embodiment of the present invention. In the exemplary embodiment, system 100 is mounted on a vehicle 102, such as, but not limited to, an aircraft, a wheeled vehicle, a tracked vehicle, a watercraft, a space vehicle, and a ballistic projectile or a guided weapon system. System 100 includes at least one multi-spectral sensor 104. In the exemplary embodiment, sensor 104 includes a housing 106, a shade 108 coupled to housing 106. Shade 108 is sized and/or configured to block stray illumination and/or limit a field of view 110 of sensor 104. Sensor 104 also includes a detector 112 configured to receive electromagnetic radiation as is emitted by stars and stellar objects 114. A lens 116 is used to protect detector 112 and to modify the path of rays of the electromagnetic radiation to focus, or collimate the rays or to modify field of view 110 to match an opening 118 of shade 108. In one embodiment, sensor 104 includes an onboard processor 120. In various other embodiments, sensor 104 does not include an onboard processor, rather processing of data received through detector 112 is transmitted to an off-board or main processor 122. In one embodiment, sensor 104 comprises a digital imager capable of viewing the entire sky to eliminate the need for individual lenses or gimbals to track selected stars. In the embodiment where the digital images is capable of viewing the entire sky, shade 108 is unneeded and would generally be absent from sensor 104. Sensor 104 is responsive in the infra red, ultra violet, visual and radio bands to both improve daytime visibility and visibility through smoke, fog, and clouds. Because of the multi-spectral capability to see through smoke, fog, and clouds, system 100 is intended to be a stand alone navigation system independent of for example, inertial, GPS, and NavAid systems.

During operation, sensors 104 make star observations with respect to a body-fixed reference frame pertaining to each sensor 104 only. Sensor 104 can provide star positions in a reference frame fixed with respect to sensor 104 for a plurality of stars simultaneously. Sensor 104 reports stars 114 at Cartesian coordinate positions in field-of-view (FOV) 110 of sensor 104. These (x,y) positions may be converted to unit vectors, expressed in reference frame 124, which includes a Z-axis 126 generally co-linear with a boresight 128 of sensor 104, an X-axis 130, and a Y-axis 132.

In the exemplary embodiment, sensor 104 is rigidly coupled to vehicle 102, therefore reference frame 124 corresponds to a reference frame of vehicle 102 permitting a time-invariant transformation between the fixed frame of vehicle 102 and reference frame 124 to be defined.

In one embodiment, a lost-in-space stellar attitude acquisition process is used to determine an orientation of each sensor 104. The process accepts sensor 104 data and stored star catalog data as input. From this information, processor 120 or system 100 computes an attitude estimate and a list of identified stars acquired by each sensor 104. A larger field of view 110 permits a greater accuracy of the attitude determination.

Figure 2:
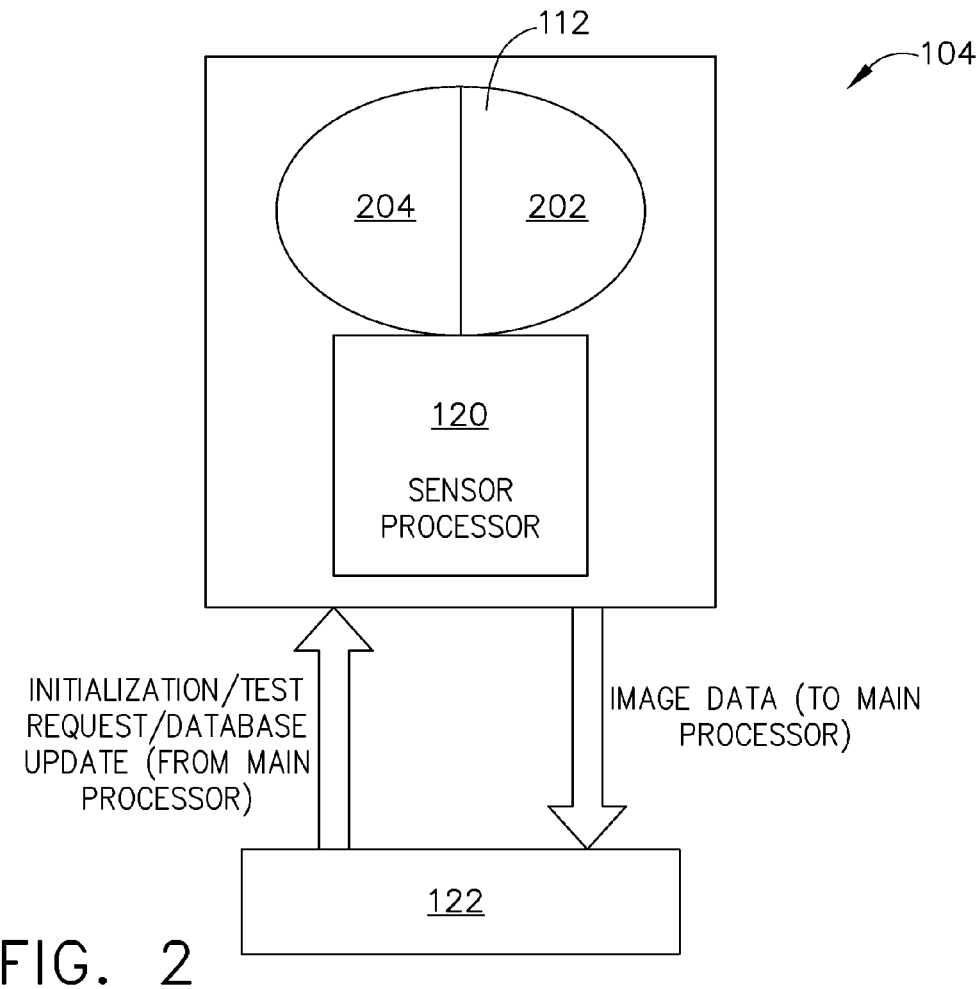

FIG. 2 is a schematic block diagram of multi-spectral sensor 104 (shown in FIG. 1) in accordance with an exemplary embodiment of the present invention. In the exemplary embodiment, sensor 104 includes a single detector 112 responsive to at least a first and a second wavelength band of electromagnetic radiation. In various embodiments, the wavelength bands of electromagnetic radiation include but are not limited to infrared, ultraviolet, visual, and radio wavelength bands. In one embodiment, detector 112 includes a first detector surface area 202 responsive to a first wavelength band of electromagnetic radiation and a second detector surface area 204 responsive to a second wavelength band of electromagnetic radiation. In various other embodiments, more than two detector surface areas are used.

Figure 3:
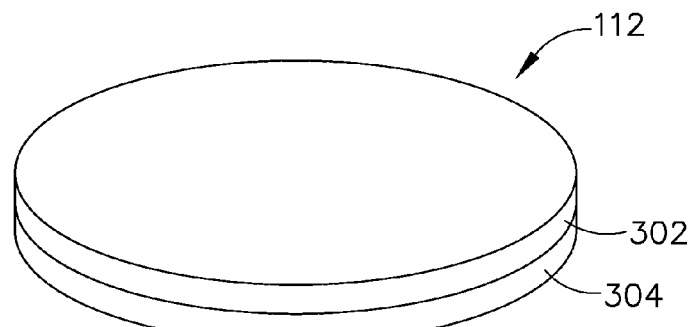

FIG. 3 is a schematic block diagram of sensor 104 in accordance with another embodiment of the present invention. In this embodiment, sensor 104 includes a single detector 112 that includes a first detector layer 302 responsive to a first wavelength band of electromagnetic radiation and a second detector layer 304 responsive to a second wavelength band of electromagnetic radiation. In another embodiment, single detector 112 includes a detector layer or a detector surface area that is responsive to at least a first wavelength band of electromagnetic radiation and a second detector layer or a detector surface area that is responsive to the first and a second wavelength band of electromagnetic radiation such that the response to first wavelength band of electromagnetic radiation may be cancelled out in the second detector layer or detector surface area to permit determining to responsiveness of the second layer or surface area to only the second wavelength band of electromagnetic radiation.

Figure 4:
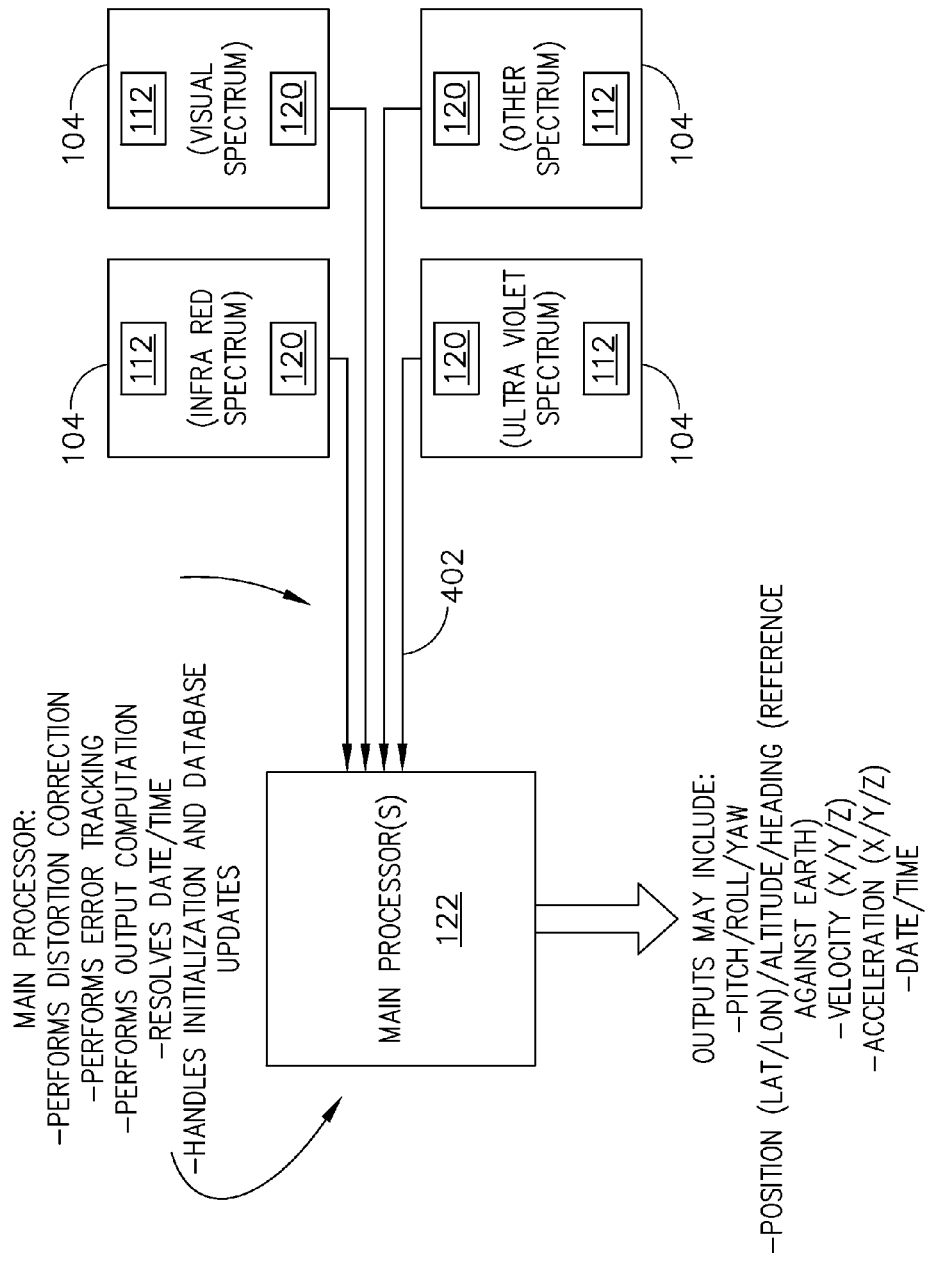

FIG. 4 is another schematic block diagram of multi-spectrum celestial navigation system 100 (shown in FIG. 1) in accordance with another embodiment of the present invention. In this embodiment, multiple sensors 104 are communicatively coupled to main processor 122. In this embodiment, each sensor 104 is illustrated with a single detector 112 responsive to a single wavelength band of electromagnetic radiation in communication with sensor processor 120. However, each sensor 104 could have more than one single detector 112 responsive to more than one wavelength band of electromagnetic radiation. Sensors 104 are located near a surface of vehicle 102 (shown in FIG. 1) or within vehicle 102 with a view to the sky. Sensors 104 are communicatively coupled to main processor 122 through a high speed data transfer bus 402. Main processor 122 is responsible for hybridizing the images received from sensors 104 and for performing the celestial navigation computations. Main processor 122 may be built into a stand alone box to be installed anywhere in the aircraft, or the processing software may be installed as part of a larger avionics suite (independent of target hardware) or as part of a partitioned ARINC-653 environment as long as processing and memory requirements are met.

Figure 5:
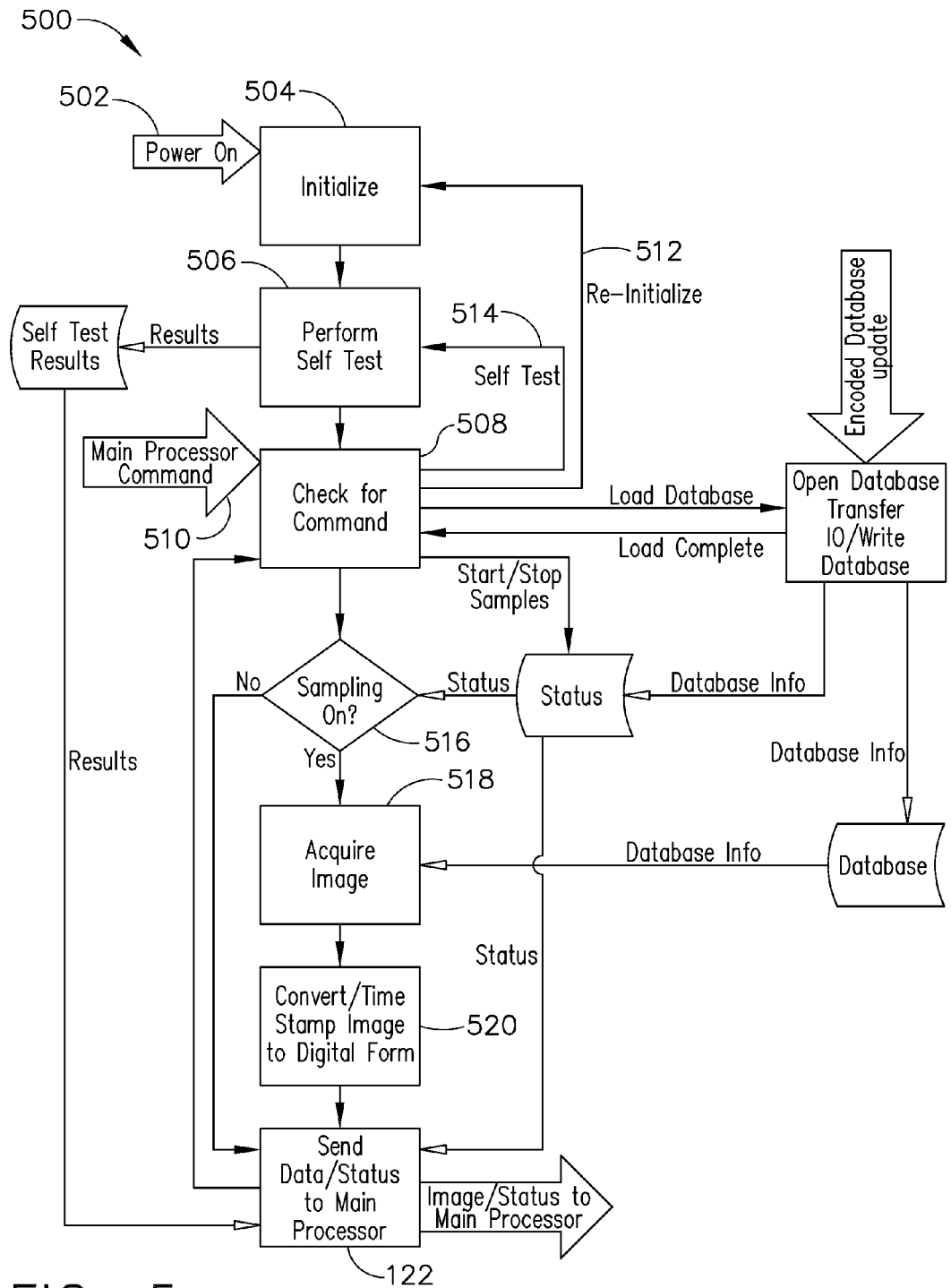

FIG. 5 is a control/data flow chart 500 of sensor 104 in accordance with an exemplary embodiment of the present invention. In the illustrated control/data flow chart 500, control flow is denoted by solid headed arrows and data flow by unfilled headed arrows. In the exemplary embodiment, upon power up 502, sensor 104 initializes 504 and performs a series of self tests 506. Sensor 104 then begins auto-sequencing 508. Processor 120 checks for a main processor 122 command 510 and executes the received command. Such commands may include a sensor re-initialization 512, sensor self test 514, or other command.

If sampling is on 516, images are acquired 518, the images converted to digital if not acquired in digital form and date and time stamped 520. The status of the image acquisition is transmitted to main processor 122 and control loops back to check for a command 510 from main processor 122.

Figure 6:
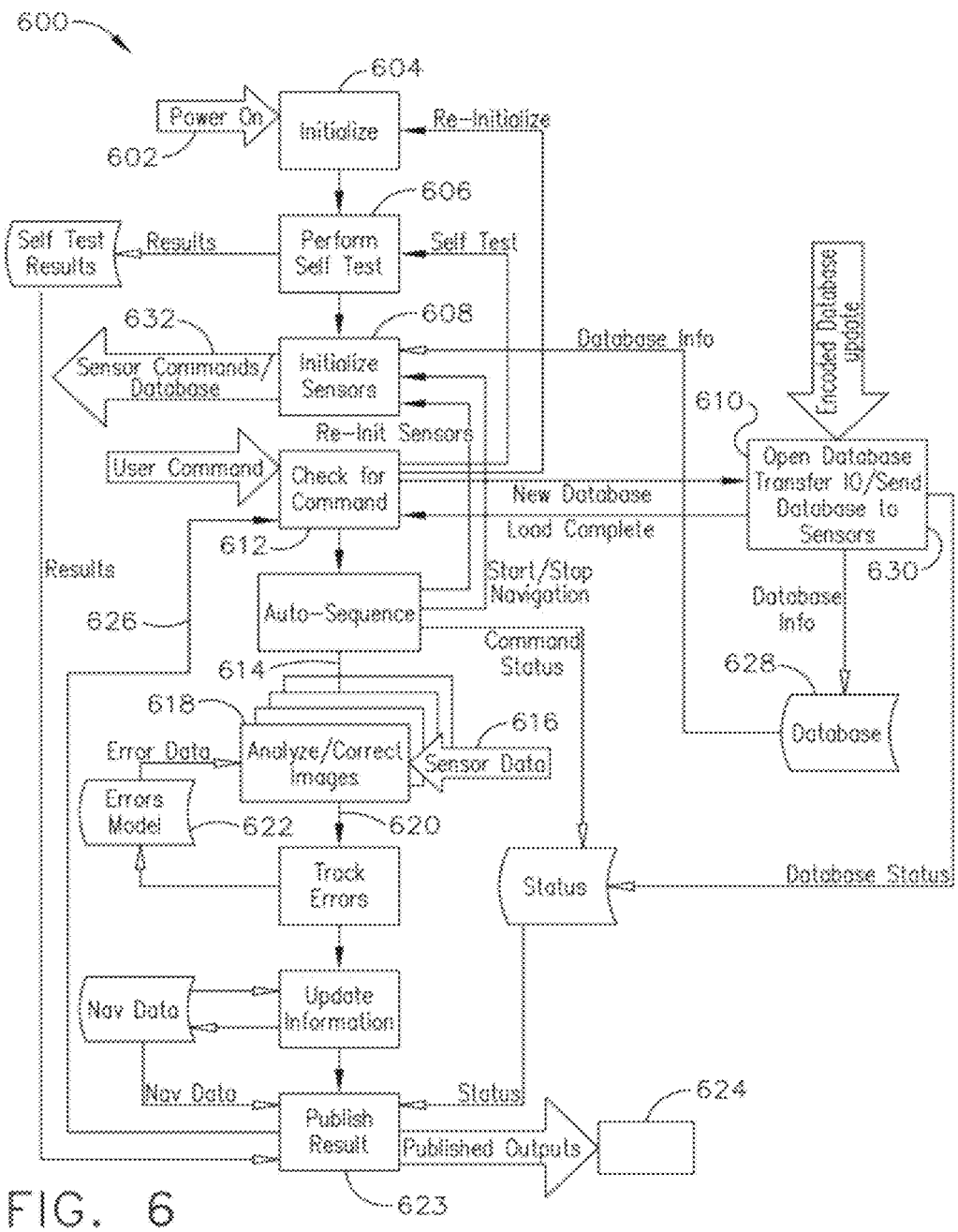

FIG. 6 is a control/data flow chart 600 of multi-spectrum celestial navigation system 100 in accordance with an exemplary embodiment of the present invention. Upon power up 602, system 100 initializes 604, perform a series of self tests 606, and enters an auto-sequencing process that includes self configuration, and testing of the remote sensors 608, coordinating the onboard star chart database with the remote sensors 610, and obtaining initial information 612 (initial position, time, etc from a user or other system). In an alternative embodiment, initial information is determined automatically using data determined from images acquired during startup. Auto-sequencing includes handling/maintaining downmoding and remote sensors management in case of failures. Once full navigational mode is entered 614, the incoming images 616 are corrected according to the latest error model 618 and combined in order to produce the navigation outputs 620. The combined multi-spectral images are also used to generate 622 an atmospheric model and the associated errors with a given portion of the sky. The error model is based on measuring the atmospheric effect against the different wavelengths from the same point of light to determine the error encountered due to atmospheric distortion. In one embodiment, the error model is a slow rate model and doesn't change very fast, for example, approximately less than one second per update. Results are then published 623 for use by an external system 624, for example, a mil-standard interface. The auto-sequencing loop starts over 626 by checking for any new user commands and processing the most recent set of captured images.

In addition to navigation information, some system and self-test status information is published and main processor 122 is responsible for maintaining a star-chart database 628 that is be updated via for example, a command interface 630 and transmitted 632 to remote sensors 104.

Figure 7:
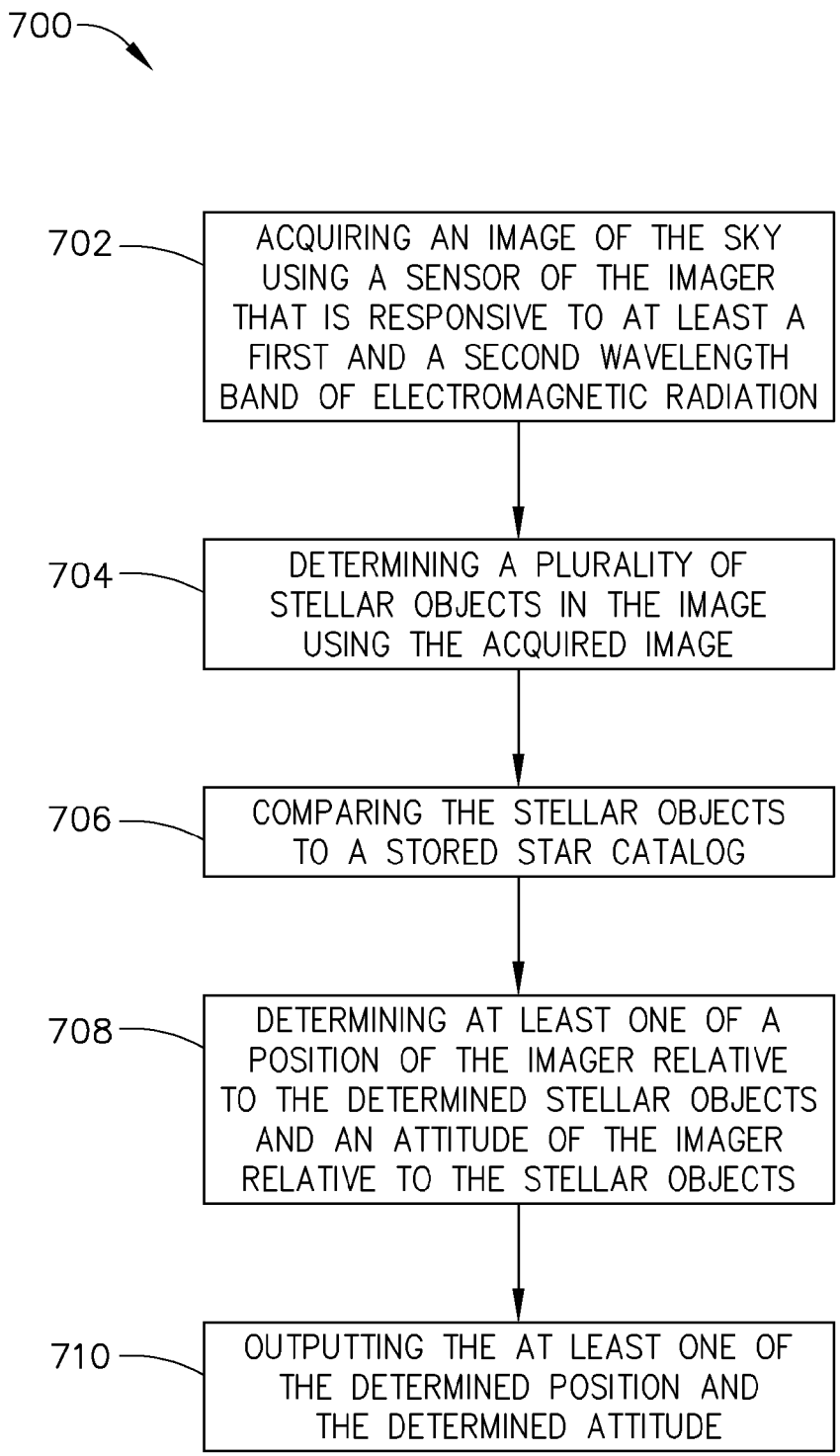

FIG. 7 is a flow chart of a method 700 of determining a position and/or orientation of a vehicle using multi-spectrum celestial navigation system 100 (shown in FIG. 1) in accordance with an exemplary embodiment of the present invention. In the exemplary embodiment, method 700 includes acquiring 702 an image of the sky using a sensor of the imager that is responsive to at least a first and a second wavelength band of electromagnetic radiation, determining 704 a plurality of stellar objects in the image using the acquired image, comparing 706 the stellar objects to a stored star catalog, determining 708 at least one of a position of the imager relative to the determined stellar objects and an attitude of the imager relative to the stellar objects, and outputting 710 at least one of the determined position and the determined attitude.

Figure 8:
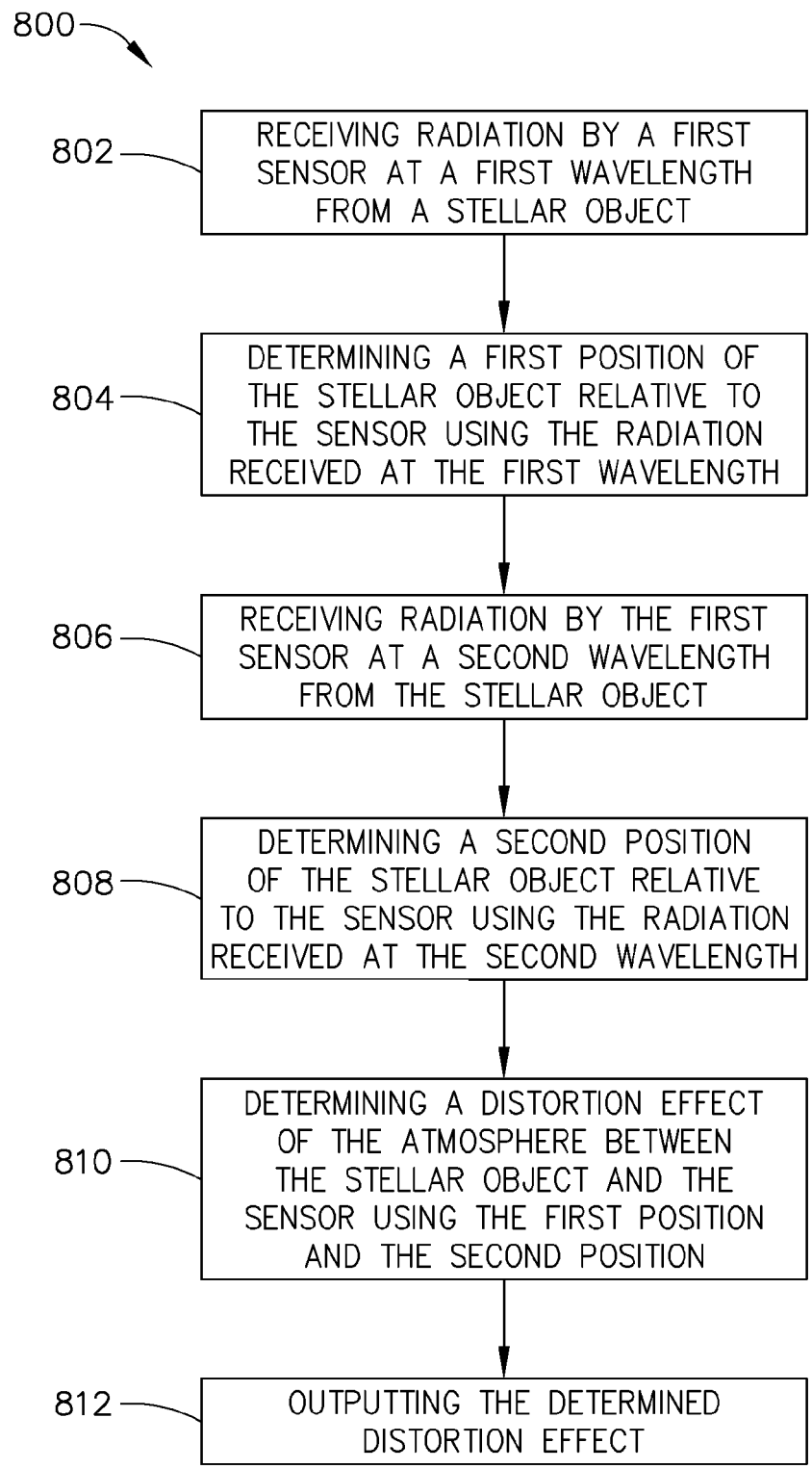

FIG. 8 is a flow chart of a method 800 for modeling atmospheric distortion in accordance with an exemplary embodiment of the present invention. In the exemplary embodiment, method 800 includes receiving 802 radiation at a first wavelength from a stellar object, determining 804 a first position of the stellar object relative to the sensor receiving the radiation at the first wavelength, receiving 806 radiation at a second wavelength from the stellar object, determining 808 a second position of the stellar object relative to the sensor receiving the radiation at the second wavelength, determining 810 a distortion effect of the an atmosphere between the stellar object and the sensor using the first position and the second position, and outputting 812 the determined distortion effect.

Figure 9:
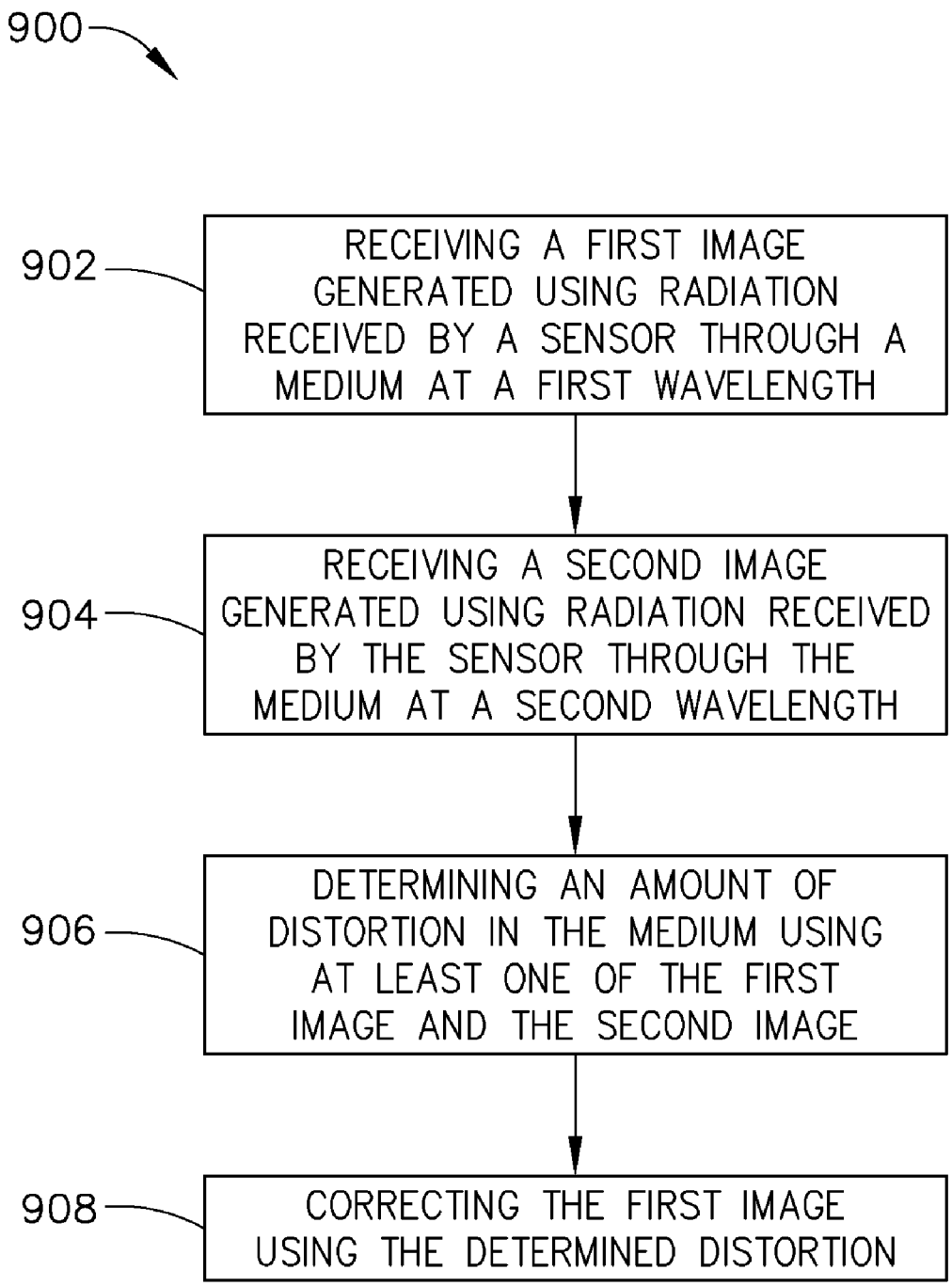

FIG. 9 is a flow chart of a method 900 for correcting distortion in sensor images in accordance with an exemplary embodiment of the present invention. In the exemplary embodiment, method 900 includes receiving 902 a first image generated using radiation received by a sensor through a medium at a first wavelength, receiving 904 a second image generated using radiation received by the sensor through the medium at a second wavelength, determining 906 an amount of distortion in the medium using at least one of the first image and the second image, and correcting 908 the first image using the determined distortion. As used herein, distortion refers to an undesirable change in an accuracy of a representation of an object in an image due to the medium modifying the path, frequency, or amplitude of the radiation as the radiation passes through the medium.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 120 and 122, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is overcoming the major limitations of existing celestial navigation systems relating to obscuration of the celestial bodies used to fix a position of the navigation system sensors. Moreover, the system also overcomes an error encountered due to atmospheric distortion by measuring/modeling the atmospheric effect against the different wavelengths from the same point of light. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of multi-spectral celestial navigation provides a cost-effective and reliable means determining a position and/or an attitude of a vehicle using only celestial bodies. More specifically, the method and system described herein facilitate permitting an imager to be able to view a field of view of the sky through obscuring phenomenon and correct for atmospheric distortion. In addition, the above-described method and system facilitates observing the sky through multiple remotely positioned redundant sensors that are available in spite of the attitude of the vehicle. As a result, the method and system described herein facilitate automatically determining a vehicle position and/or attitude using only celestial navigation in a cost-effective and reliable manner.

An exemplary method and system for automatically determining a vehicle position and/or attitude with respect to a predetermined reference using only celestial navigation are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A multi-spectrum celestial navigation system comprising:
  a first sensor comprising a single detector responsive to at least a first and a second wavelength band of electromagnetic radiation, said single detector comprising a first detector layer responsive to a first wavelength band of electromagnetic radiation and a second detector layer responsive to a second wavelength band of electromagnetic radiation, said sensor configured to generate a first output related to the first wavelength band of electromagnetic radiation and to generate a second output related to the second wavelength band of electromagnetic radiation;
  a processor programmed to:
  receive the first and second outputs;
  determine a position of the sensor with respect to one or more stars using a stored star catalog and the received first and second outputs;
  determine an attitude of the first sensor; and
  output at least one of the determined position and the determined attitude.

2. A system in accordance with claim 1, wherein the at least a first and a second wavelength band of electromagnetic radiation comprises at least one of infrared, ultraviolet, visual, and radio wavelength bands.

3. A system in accordance with claim 1, wherein said single detector comprises a first detector surface area responsive to a first wavelength band of electromagnetic radiation and a second detector surface area responsive to a second wavelength band of electromagnetic radiation.

4. A system in accordance with claim 1, wherein said processor is further programmed to determine an attitude of said sensor using an average of a position of a plurality of stars relative to the position of the sensor.

5. A system in accordance with claim 1, wherein the first and second outputs comprise images of at least a portion of the sky that include stars identified within the star catalog.

6. A system in accordance with claim 1, wherein said processor is further programmed to generate a first and second image using said first and second output respectively.

7. A system in accordance with claim 1, wherein said processor comprises a main processor programmed to receive hybridized images from at least said first sensor.

8. A system in accordance with claim 7, further comprising a plurality of sensors communicatively coupled to said main processor.

9. A system in accordance with claim 7, wherein each sensor comprises said processor, each of said processors communicatively coupled to said main processor.

10. A system in accordance with claim 1, wherein said processor and said first sensor are housed in a common enclosure.

11. A system in accordance with claim 1, wherein said single detector comprises a first at least one of a detector layer and a detector surface area responsive to at least a first wavelength band of electromagnetic radiation and a second at least one of a detector layer and a detector surface area responsive one of the first and the second wavelength band of electromagnetic radiation.

12. A vehicle comprising:
  a plurality of sensors, at least one of said plurality of sensors comprising a single detector, said single detector comprising a first detector layer responsive to a first wavelength band of electromagnetic radiation and a second detector layer responsive to a second wavelength band of electromagnetic radiation, each of said plurality of sensors responsive to at least a first and a second wavelength band of electromagnetic radiation emitted by a plurality of stellar objects in a field of view of the sensor, each sensor communicatively coupled to a sensor processor onboard the sensor, said sensor processor programmed to generate an image of the plurality of stellar objects;
  a main processor communicatively coupled to said sensor processor, said main processor programmed to:
  receive the images generated by the sensor processors;
  determine a position of the respective sensor with respect to one or more stars using a stored star catalog and the received images;
  determine an attitude of the respective sensor; and
  output at least one of the determined position and the determined attitude.

13. A vehicle in accordance with claim 12 wherein at least one of said plurality of sensors comprises a single detector responsive to the at least one of the first wavelength band of electromagnetic radiation and the second wavelength band of electromagnetic radiation.

14. A method for modeling atmospheric distortion, said method comprising:
  receiving radiation by a sensor comprising a single detector at a first wavelength from a stellar object using a first detector surface area responsive to the first wavelength band of electromagnetic radiation;
  determining a first position of the stellar object relative to the sensor receiving the radiation at the first wavelength;
  receiving radiation by the sensor at a second wavelength from the stellar object using a second detector surface area responsive to the second wavelength band of electromagnetic radiation;
  determining a second position of the stellar object relative to the sensor;
  determining a distortion effect of the an atmosphere between the stellar object and the sensor using the first position and the second position; and
  outputting the determined distortion effect.

15. A method for correcting distortion in sensor images, said method comprising:
  receiving a first image generated using radiation received by a sensor comprising a single detector through a medium at a first wavelength, said single detector comprising a first detector layer responsive to the first wavelength;
  receiving a second image generated using radiation received by the sensor through the medium at a second wavelength using a second detector layer responsive to the second wavelength;
  determining an amount of distortion in the medium using at least one of the first image and the second image; and
  correcting the first image using the determined distortion.

16. A method of determining a location of a vehicle using multi-spectrum celestial imager, said method comprising:
  acquiring an image of the sky using a sensor of the imager comprising a single detector that is responsive to at least a first and a second wavelength band of electromagnetic radiation, said single detector comprising a first detector layer responsive to a first wavelength band of electromagnetic radiation and a second detector layer responsive to a second wavelength band of electromagnetic radiation;
  determining a plurality of stellar objects in the image using the acquired image;
  comparing the stellar objects to a stored star catalog;

determining a position of the imager relative to the determined stellar objects and an attitude of the imager relative to the stellar objects; and outputting the at least one of the determined position and the determined attitude.

17. A method in accordance with claim 16 wherein acquiring an image of the sky comprises acquiring an image of the sky through a medium that includes at least one of smoke, fog, mist, smog, rain, snow, clouds, and ash.

18. A method in accordance with claim 16 wherein acquiring an image of the sky comprises acquiring an image of the sky using a first imager and a second imager oriented in a direction greater than ninety degrees with respect to each other.

\* \* \* \* \*